United States Patent [19]

Bhateja et al.

[11] 4,120,542
[45] Oct. 17, 1978

[54] CAGELESS THRUST BEARING WITH UNGUIDED ROLLERS

[75] Inventors: Chander Prakash Bhateja, Harwinton; Richard Lassen Alling, Torrington; Dean Edward Johnston, Thomaston, all of Conn.

[73] Assignee: The Torrington Company, Torrington, Conn.

[21] Appl. No.: 750,611

[22] Filed: Dec. 15, 1976

[51] Int. Cl.² ............................................. F16C 19/34
[52] U.S. Cl. ..................................... 308/219; 308/235
[58] Field of Search .............. 308/219, 222, 226, 231, 308/234, 235, 236, 202, 207, 215, 214, 216, 217, 187, 187.2, 187.1

[56] References Cited

U.S. PATENT DOCUMENTS

| 1,649,285 | 11/1927 | Buckwalter | 308/231 |
| 3,934,956 | 1/1976 | Pitner | 308/219 X |

FOREIGN PATENT DOCUMENTS 1,135,717  8/1962  Fed. Rep. of Germany ........... 308/219

*Primary Examiner*—Trygve M. Blix
*Assistant Examiner*—Douglas C. Butler
*Attorney, Agent, or Firm*—Frank S. Troidl

[57] ABSTRACT

The cageless thrust bearing with unguided cylindrical rollers comprises a pair of thrust bearing races with axially separated flat thrust raceways. Cylindrical rollers all having the same diameter are located between the separated flat thrust raceways. The spacing of the rollers is such that the rollers become radially aligned in the bearing under a rotating thrust load, without side or end guidance of the rollers.

5 Claims, 9 Drawing Figures

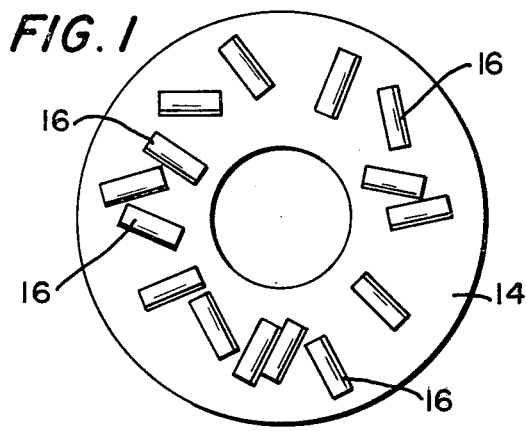
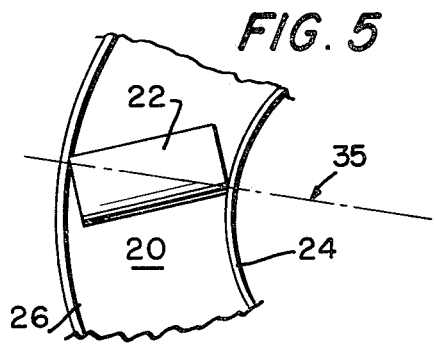
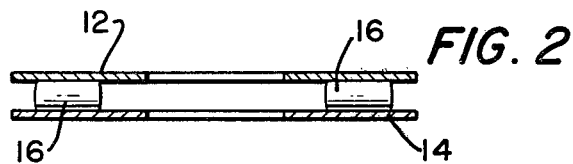
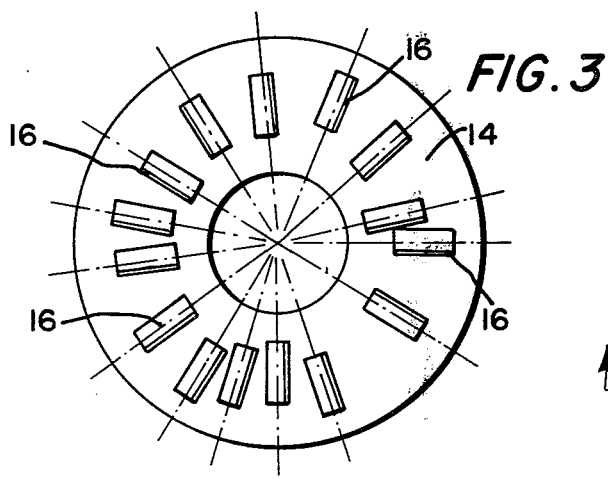
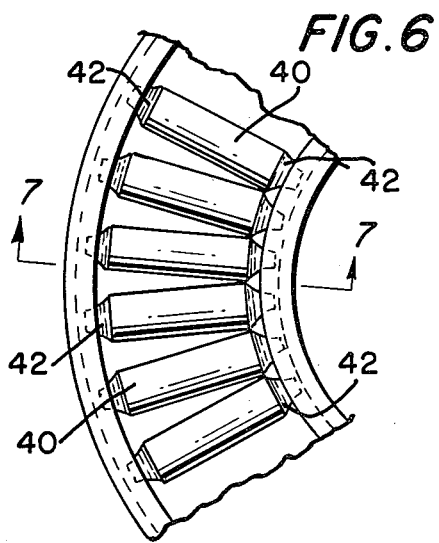
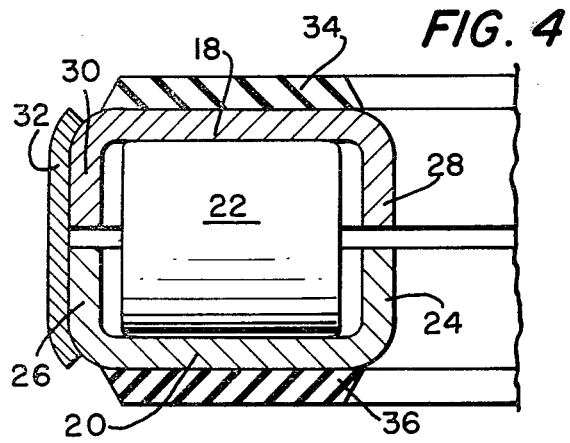
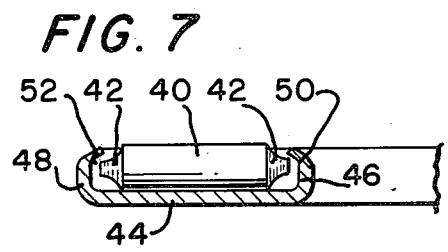

CAGELESS THRUST BEARING WITH UNGUIDED ROLLERS

This invention relates to thrust bearings. More particularly, this invention is a cageless thrust bearing with unguided cylindrical rollers.

All previously known thrust bearings with cylindrical rollers use roller guidance and orientation control means of one sort or another to keep the rollers radially aligned in the bearing. In some bearings, the rollers are guided along their sides by a cage. In other bearings, the rollers are cooperatively guided at their ends by closely fitting cooperating inner and outer control rings or flanges. In still other bearings, the rollers have mutually contacting conical surfaces at their inner ends which surfaces bear against each other to assist in the roller guidance and orientation. In still others, the rollers have individual loose guiding segments or wedges between each pair of rollers and the outer ring.

We have discovered that a thrust bearing with flat raceways and unguided cylindrical rollers will operate properly when the rollers are under load even when the thrust bearing does not have a cage, or separator to separate, orient and guide the rollers along their sides, and even when the rollers are not oriented or guided by contact against their ends. The cylindrical rollers in the rotating thrust bearing are self-orientating or self-aligning. Rollers which are not properly radially aligned in the bearing when the bearing starts to rotate will become radially aligned in the bearing generally within one complete revolution of one race relative to the other race, and will remain radially aligned as the bearing continues its rotation. This is due to the fact that the radial orientation of the roller's axis is the only dynamically stable position under the action of the two rotating thrust races. This was never known or suggested before.

The rollers do not even have to be rotating in the same pitch circle. The center of each roller may run at its own pitch radius from the center of the bearing and so long as each roller has a load on it, it will properly radially align and properly rotate at that pitch radius if it is not restrained from doing so. The rollers may contact each other or may be completely out of contact with each other.

There are currently used thrust bearings with cylindrical rollers which do not have separators or cages to orient and guide the rollers; however, the rollers of these currently used thrust bearings are radially oriented and guided at their ends by contacting radially inner and radially outer cooperating close-fitting rings or by close-fitting axial flanges on the races. In these bearings, the roller lengths must be closely controlled and uniform, the roller end faces must be flat and smooth and perpendicular to the roller axis, and the diameters and surface finish of the roller control surfaces of the rings or flanges must be closely controlled. Also, the rollers are generally short in length as compared to their diameters for such end face guidance and orientation, and this limits the bearing thrust load capacity. An example of one such currently used thrust bearing is shown and described in the German Pat. No. 1,135,717.

In our bearing, we do not use a cage or separator, and yet we do not have to closely control the lengths and end faces of the rollers. Because we do not have a cage, we obviously avoid the expense of manufacturing and installing the cage. Also, because we may utilize a full complement of rollers, we have a greater bearing load capacity than does a comparable caged thrust bearing of the same overall dimensions.

As compared to other cageless thrust bearings with cylindrical rollers, we avoid the relatively slow and costly process of end grinding the rollers to a precise roller length dimension and roller end face finish and configuration. We avoid the costly process of precision grinding of the cylindrical guiding and control surfaces on the rings or flanges. We avoid the costly precision grinding of identical conical surfaces near one end of those cylindrical rollers which use these conical surfaces for their orientation and guidance in thrust bearings.

Instead, we can have a full complement bearing using rollers of random yet relatively similar lengths such as are blanked out at extremely high rates in wire and rod chopping or shearing machines, and finish ground at extremely high production rates in "through-feed" centerless grinding. Conversely, if we so desire we can operate with a less-than-full-complement of unguided rollers, even to the extreme extent of using a single roller. Even the single roller will become radially oriented in the bearing where there is relative rotation of the races under load. In all of our bearings the rollers need nothing except rotating rolling raceway contact to become and remain properly radially oriented.

The currently known full-complement thrust bearings have rollers which are relatively short in relation to their diameters. This is because it has been known not to be practical to try to radially orient a long roller merely by the twisting force or the coupling moment due to cooperative end face contact between one line against the inner control ring and two points against the outer control ring. With our bearing, however, we may utilize long rollers, even to the extent of using rollers whose lengths are several times their diameters. Thus, we have the ability to design full complement bearings with unguided rollers which will resist much greater thrust loads than the previous full-complement thrust bearings using rollers of the same diameter. However, where desired, we may also use short rollers or mixed-length rollers; all lengths are capable of self-orientation.

Briefly described, our cageless thrust bearing with unguided cylindrical rollers comprises a pair of races with axially separated flat thrust raceways. A plurality of cylindrical rollers all having the same diameter are located between the races. There is no bearing cage or separator; there are no close-fitting orienting and guiding rings or flanges. The spacing of the rollers is such that the rollers can become radially aligned under load as the bearing rotates.

Containment means may be provided to prevent the rollers from falling out of the bearing or being flung out of the bearing by centrifugal force when not under load. No-load conditions may occur in handling and shipping. They may also occur in service when the races are not exactly parallel and the rollers alternately become loaded and unloaded as the bearing rotates. In some cases, a race may completely pull away from the whole complement of rollers. The roller containment means, may, for example, be axial flanges on the thrust races, or loose rings instead of the flanges. These would be spaced from the nominal circles of the inner and outer ends of the rollers. Depending on the particular bearing application, we may use only one such containment means. This one normally would be around the outer ends of the rollers, to prevent the rollers from being lost from the rotating bearing by centrifugal force while the rollers were carrying no bearing thrust load.

In some cases, the bearing raceway may be formed directly on a radial shoulder on a shaft or a radial wall of a counterbore. This might be done to save the expense of separate races or to save space in the mechanism in which the bearing is installed. The shaft itself in its smaller diameter which enters inside the complement of rollers might act as the inner containment ring. The axially extending cylindrical wall of the counterbore could act as the outer containment ring. Any combination of inner and outer containment means may be used as desired or required, or there may be no containment at all. The latter condition would only apply where there is assurance that no roller could be lost from the bearing by dropping out or by being flung out while under no-load conditions.

The containment means are not intended to cooperatively radially guide or orient the rollers and are too loosely fitted for them to do so. The rollers have the freedom to be self-orienting.

The invention, as well as its many advantages, may be further understood by reference to the following detailed description and drawings in which:

FIG. 1 is a view of the bottom race of a thrust bearing somewhat schematically illustrating possible positions of the rollers on the bottom race without orientation before the top race is rotated;

FIG. 2 is a side view in section showing one embodiment of our thrust bearing;

FIG. 3 is a view similar to FIG. 1 but showing the rollers on the bottom race oriented in radial alignment after the top race has started rotation;

FIG. 4 is a fragmentary sectional view illustrating a second preferred embodiment of our invention;

FIG. 5 is a fragmentary view showing the lower race of the thrust bearing of FIG. 4 with one roller, and useful in explaining a feature of the embodiment of FIG. 4;

FIG. 6 is a cylindrical roller bearing assembly using cylindrical rollers with trunnions;

FIG. 7 is a sectional view taken along lines 7—7 of FIG. 7 and in the direction of the arrows;

Like parts are referred to by like numbers in the various Figures.

Figure 8:
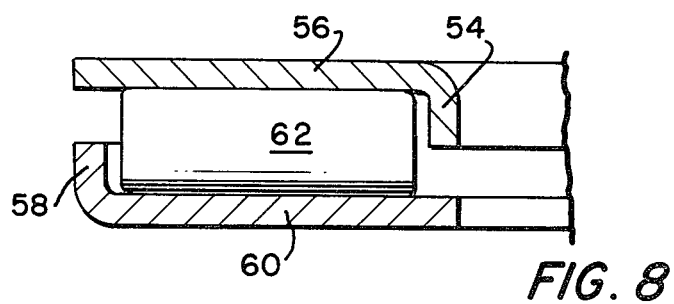
FIG. 8 is a fragmentary sectional view of still another embodiment of our invention.

Referring to the drawings, and more particularly to FIGS. 1 through 3, a cageless thrust bearing with unguided cylindrical rollers is shown. The thrust bearing includes a pair of axially separated flat thrust races 12 and 14 (see FIG. 2). A plurality of cylindrical rollers 16 are located in the space between the thrust races 12 and 14. In FIG. 1 the rollers 16 are shown, somewhat schematically, in their positions on race 14 before an orienting moment or couple is applied to them by rotation of the thrust race 12. The rollers are not radially aligned. However, we have discovered that as long as the rollers are placed on the race 14 in a generally radial direction, the rollers 16 will quickly become radially aligned as shown in FIG. 3 when a dynamic load is applied to them by the rotation of the thrust race 12. No cage or separator is needed; the ends of the rollers need not be guided. It is not necessary that the rollers have a relatively large diameter compared to the length of the rollers, although we can use those proportions. We do not need a full complement of rollers, although we can use a full complement. If the cylindrical rollers have space to move without too great a restraining interference either from one another or from other components of the bearing, the rollers all become radially aligned in the bearing when bearing thrust load is applied and one race rotates relative to the other race.

What is required is enough space for the self-orientation. When the rollers start out relatively radially aligned, that is within a few degrees of radial alignment, we can have a full complement of rollers with extremely fast radial orientation. On the other hand, if a roller starts out perpendicular to a radial line and centered on that radial line of the bearing, it takes more space and more time for the roller to become radially oriented. This is especially true when we are using square-end rollers wherein the square end of one roller may butt against the cylindrical side of another roller and the two mutually interfere with one another. For quick orientation of the sideways turned rollers, therefore, it is better to use spherical ended rollers, for their rounded ends will slide easily along the sides of the other rollers and will present no resisting couple load. Nevertheless, given enough space the square-ended rollers will self-orient eventually even when turned far away from radial orientation at the start of bearing rotation. However, when the roller space is restricted, for example when you have a full complement of rollers very badly oriented between inner and outer containment rings, it is possible that some rollers would merely be scraped along between outer ring and roller and never would have sufficient room and freedom to be self-orienting. It is best, when using many rollers in a restricted amount of space, to start with the rollers not far off their final radial orientation.

The rollers 16 are flat ended rollers; however, if desired, the rollers may have spherical ends or ends of any other desired shape not larger in diameter than the cylindrical diameter of the roller. The use of spherical ended rollers will, however, result in some reduction in life and load rating of a bearing with any given radial space, as compared to life and load rating of a thrust bearing using square ended rollers of the same length as the spherical ended rollers.

Under some circumstances it is desirable to make certain the rollers will be contained within the thrust bearing. One embodiment including the containment means is shown in FIG. 4. The thrust bearing shown in FIG. 4 includes a pair of axially separated thrust races 18 and 20 between which are located a plurality of flat ended cylindrical rollers 22. The containment members include an inner annular flange 24 and an outer annular flange 26, both integral with the race 20. The containment members also include an inner annular flange 28 and an outer annular flange 30, both integral with the race 18. Note particularly that the radial space between the inner and outer containment flanges is enough greater than the axial lengths of the rollers 22 that the flanges do not cooperate to guide or control the radial orientation of the rollers 22. As we have said, the rollers are self-orientating or self-aligning.

In the embodiment of FIG. 4 an annular cup 32 serves to hold the races 18 and 20 together. It may also serve as a seal to prevent loss of lubricant or entry of contaminants. Annular shock absorbing pads 34 and 36 are bonded on the outsides of annular races 18 and 20, respectively to absorb and distribute shock loads. In some bearing assemblies, a single resilient shock absorbing pad may be used. In addition to its primary function, the pad also allows the races to stay parallel in spite of slight misalignment of the equipment in which the bearing is used.

As shown in FIG. 5, the spacing between the flanges 24 and 26 is less than the diagonal length 35 of the roller 22. If the roller is dropped loosely in the bearing with its axis roughly radial so that a radial line of the bearing passes through each end of the roller, the roller cannot possibly pivot so far in the wrong direction that interference by flange and rollers can ever prevent its self-orientating. The race rotating against it will always cause it to become radially aligned.

The discovery that cylindrical rollers will self-align or self-orient themselves radially in a thrust bearing may be used to form a cageless thrust bearing assembly with unguided rollers which includes only one race. Such a thrust bearing is shown in FIG. 6 and FIG. 7. The plurality of cylindrical rollers 40 all having the same diameter also have trunnions 42 at each end. The flat race 44 is provided with an inner axial containment flange 46 and an outer axial containment flange 48 (see FIG. 7). The axial flanges 46 and 48 have radially turned-in portions 50 and 52, respectively extending over trunnions 42. With the correct bearing proportions, this will form a self-contained assembly.

As with the other embodiments, the flanges 46 and 48 serve only as containment members and in no way cooperatively radially guide or align the trunnion ended rollers 40. The radial space between the axial flanges 46 and 48 is greater than the axial length of the rollers 40.

In the embodiment shown in FIG. 8 the containment means includes only an inner flange 54 on the race 56 and only an outer flange 58 on the race 60. As with the other embodiments the radial space between flanges 54 and 58 is greater than the axial length of the roller 62 so that the flanges 54 and 58 in no way serve as a guide for the rollers 62.

Figure 9:
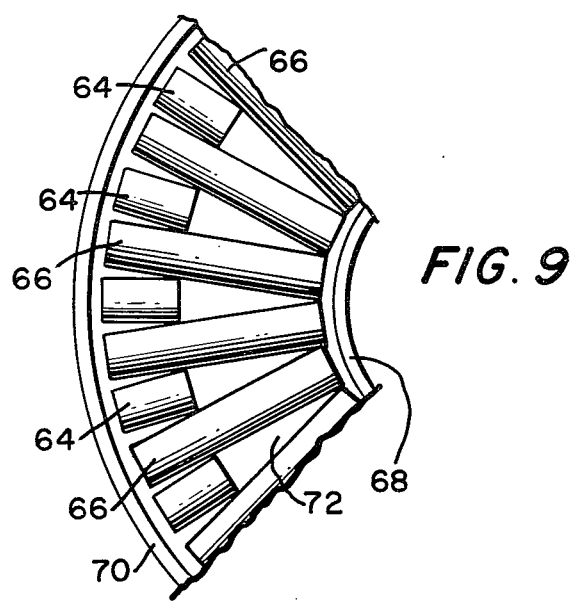
FIG. 9 is a fragmentary plan view showing the bottom race and rollers of still another preferred embodiment of our invention.

It is not necessary in the practice of this invention that all of the rollers in one bearing be of the same length so long as the rollers are of the same diameter, although normally the rollers would be approximately the same length. In the embodiment shown in FIG. 9, the rollers 64 located between rollers 66 are much shorter than the rollers 66. They are, however, of the same diameter. As with the other embodiments, the rollers 64 and 66 are not in any way radially guided or oriented by axial flanges 68 and 70 on the race 72. If we desired to do so, we could use random lengths of rollers in the same bearing. We merely have to insure by proper configuration that these will not be interference that would prevent even one roller from assuming its radial orientation.

Of course, various other containment means may be provided other than integral flanges. For example, separate loose rings may be substituted for the flanges. In some bearings, only a single containment ring or flange may be provided, generally around the outside ends of the complement of rollers. Also, though flat ended cylindrical rollers are shown in the embodiments except for the embodiment shown in FIG. 6 and FIG. 7, it is to be understood that other types of rollers may be used such as spherical ended cylindrical rollers, or others.

We claim:

1. A cageless thrust bearing with unguided cylindrical rollers comprising: a pair of axially separated flat thrust bearing raceways; a plurality of cylindrical rollers all having the same diameter located between said separated flat thrust raceways; and a pair of axially extending radially separated containment members, the radial separations of the containment members being too great and the lengths of the cylindrical rollers too small for both ends of the radially aligned cylindrical rollers to contact the containment members at the same time when the containment members are concentric or for the containment members to cooperatively radially orient the cylindrical rollers.

2. A thrust bearing in accordance with claim 1 wherein the containment members include an inner flange and an outer flange on the radially inner and radially outer peripheries of at least one of the bearing raceways.

3. A thrust bearing in accordance with claim 2 wherein the diagonal lengths of the rollers is greater than the radial space between the inner flange and the outer flange.

4. A cageless thrust bearing with unguided cylindrical rollers comprising: a pair of thrust bearing races with axially separated annular flat raceways; each race having a pair of radially separated axially extending flanges; a plurality of said spaced cylindrical rollers each having a diagonal length and each having the same diameter axially located between the annular flat raceways and radially located between the flanges; the spacing of the rollers being such that the rollers become radially aligned upon application of a rotating load to the thrust bearing; the radial spacing of the flanges on each annular flat race being greater than the axial lengths of the rollers, but less than the diagonal lengths of the rollers; an outer annular cup surrounding the two races; and an annular shock absorbing member located on the annular outside of at least one of the thrust races.

5. A cageless thrust bearing with unguided cylindrical rollers comprising: a pair of thrust bearing races with axially separated annular flat raceways; each race having a pair of radially separated axially extending flanges; a plurality of spaced cylindrical rollers each having a diagonal length and each having the same diameter axially located between the annular flat raceways and radially located between the flanges; the spacing of the rollers being such that the rollers become radially aligned upon application of a rotating load to the thrust bearing; the radial spacing of the flanges on each annular flat race being greater than the axial lengths of the rollers but less than the diagonal lengths of the rollers; and an outer annular cup surrounding the two races.

* * * * *